Patented Sept. 6, 1949

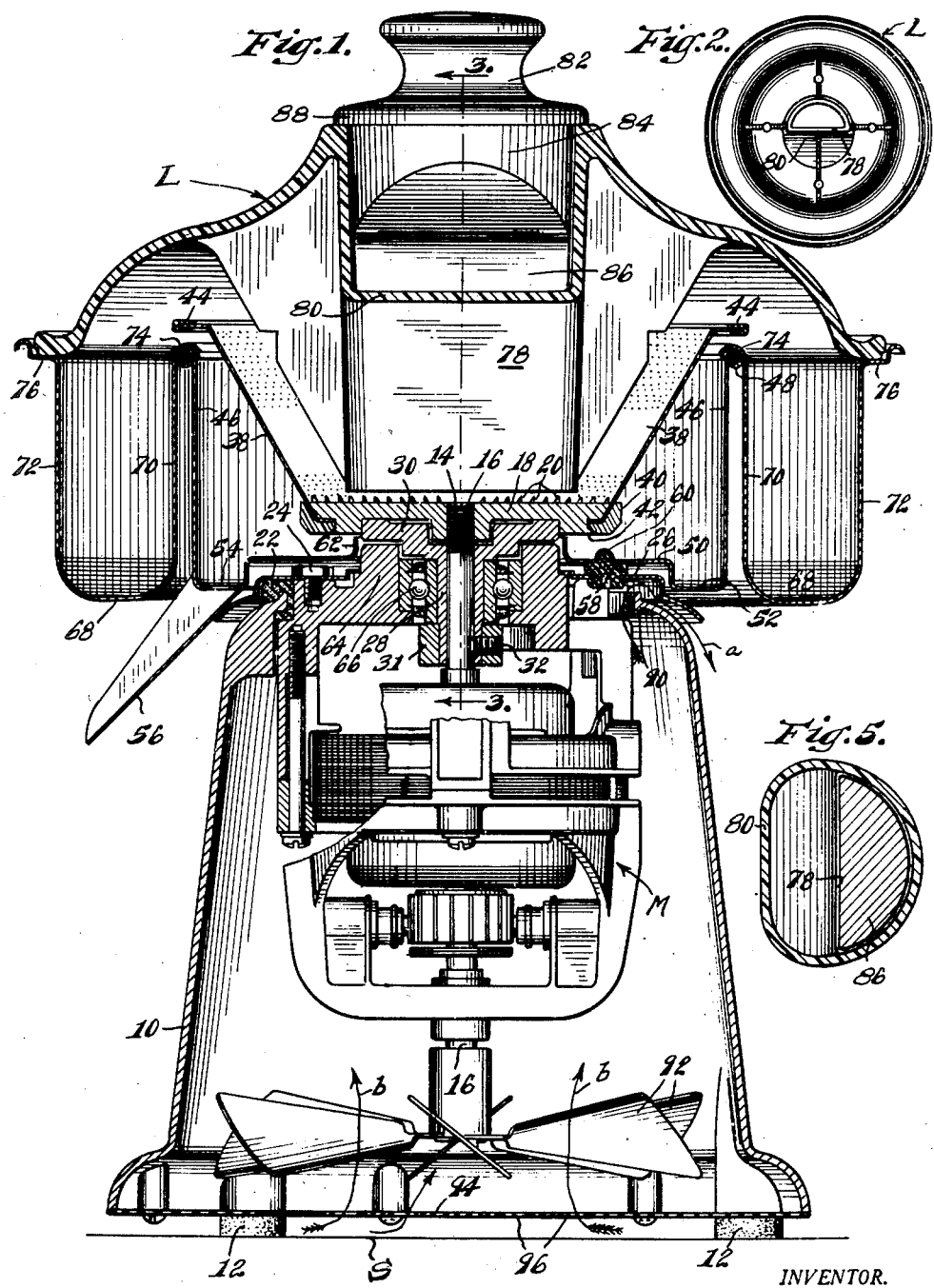

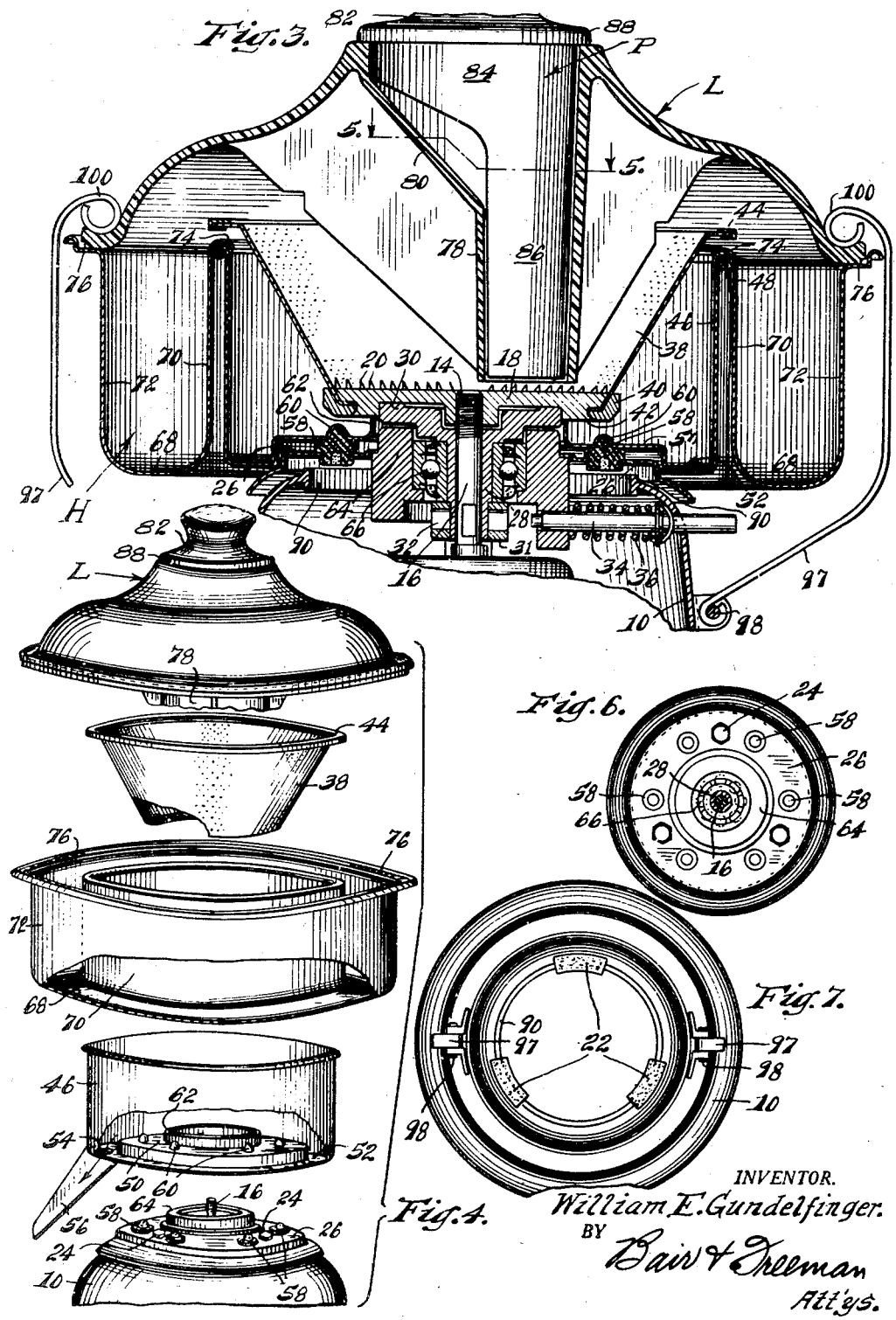

2,481,010

UNITED STATES PATENT OFFICE 2,481,010

JUICER FOR FRUITS AND VEGETABLES WITH VERTICAL AXIS ROTATING GRATER PLATE

William E. Gundelfinger, St. Louis, Mo., assignor to Knapp-Monarch Company, St. Louis, Mo., a corporation of Delaware Application August 17, 1948, Serial No. 44,683

6 Claims. (Cl. 146—76)

This invention relates to a juicer for fruit, vegetables and the like, wherein the material is grated and the juice is then extracted from the pulp by centrifugal action, the construction of the mechanism being such as to provide continuous operation of the juicer.

One object of the invention is to provide a juicer wherein an electric motor or the like rotates a grater plate for grating pulp from fruit or vegetables fed to the grater blade, a perforated bowl being provided which is rapidly rotated by the motor for separating the juice from the pulp by centrifugal action, one means being provided to draw off the juice and another means being provided to receive the pulp in a progressive manner.

Another object is to provide mechanism which is simple, durable and inexpensive to construct and which operates with maximum efficiency.

Still another object is to provide a juicer wherein the perforated basket for separating the juice from the pulp has an annular wall which is inclined upwardly and outwardly at a suitable angle so that the pulp gradually works up its surface and is expelled into an annular pulp receiving trough having considerable capacity for providing operations of the machine a substantial length of time without the necessity of cleaning out the accumulated pulp.

A further object is to provide the annular pulp receiving trough readily removable for cleaning purposes and of a cross sectional shape that eliminates any crevices and the like so that cleaning is facilitated.

Still a further object is to provide a juicer in which vibration is minimized by suspending the motor in a supporting housing by means of rubber inserts and then supporting the juice receiving receptacle, the annular pulp receiving trough and the lid of the juicer on rubber buttons supported by the motor.

An additional object is to provide an assembly that can be readily taken apart for cleaning in which a juice receiving receptacle is supported on the motor, the annular pulp receiving trough is in turn supported on the juice receiving receptacle and the lid for the juicer is supported on the annular pulp receiving trough with arms to snap into position and hold the parts assembled, the arms being resilient to prevent transmission of vibration from the base to the assembly.

Another additional object is to provide the lid of the juicer formed of plastic material or the like which is transparent so that the operation of the juicer can be observed at all times.

With these and other objects in view, my invention consists in the construction, arrangement and combination of the various parts of my juicer whereby the objects contemplated are attained, as hereinafter more fully set forth, pointed out in my claims and illustrated in the accompanying drawings, wherein:

Figure 1 is a vertical sectional view through a juicer embodying my present invention.

Figure 2 is a bottom plan view of the lid of the juicer.

Figure 3 is a sectional view on the line 3—3 of Figure 1.

Figure 4 is an exploded perspective view showing the removable parts of the juicer.

Figure 5 is a sectional view on the line 5—5 of Figure 3.

Figure 6 is a sectional view on the line 6—6 of Figure 3, and

Figure 7 is a plan view of the base showing vibration isolating inserts for suspending the motor in relation to the base.

On the accompanying drawings I have used the reference numeral 10 to indicate a mounting base which serves as a housing for a motor M. The motor M has a shaft 16, and a grater plate 18 is adapted to be mounted on the upper end thereof as by means of screw threads 14. The upper surface of the plate 18 has grater teeth 20 for the purpose of grating pulp from the fruit and vegetables.

The base 10 is supported by three feet 12 of rubber or the like so as to minimize the transmission of vibration thereof to a supporting surface S. The motor M in turn is mounted so as to minimize the transmission of vibration therefrom to the base 10 by means of three inserts of rubber or the like 22. One of these is shown in section in Figure 1 and their positions are shown in Figure 7 in relation to three screws 24 shown in Figures 1 and 6 which extend through a cover plate 26 and into the frame of the motor M. In this manner the cover plate 26 rests on the inserts 22 and supports the motor by means of the screws 24 so that there is no rigid metal-to-metal contact between the motor frame and the base 10.

For supporting the grater plate 18 accurately aligned with respect to the shaft 16 I provide a sleeve 28 having a flange 30. The grater plate can be unscrewed from the upper end of the shaft and to accomplish this the shaft must be held against rotation. For this purpose a collar 31 is mounted on the sleeve 28 and both the collar and the sleeve are secured to the shaft by a set screw 32 (see Figure 1). The collar 30 has a plurality of sockets 32 into which a lock pin 34 (see Figure 3) may be projected by pushing inwardly on the outer end thereof against the action of a return spring 36. The direction of rotation of the motor M is such in relation to the direction of the threads 14 that the tendency during operation is for the grater plate 18 to turn down against the flange 30.

A perforated basket 38 is secured to the periphery of the plate 18 by means of lock ring 40 with the plate 18 spun over it 42 to hold it in position. The entire assembly may then be brazed or soldered for positive connection of the parts in relation to each other.

The basket 38 is in the shape of an inverted truncated cone and its upper edge is reinforced by a metal binding 44.

Surrounding the basket 38 is a juice receiving receptacle 46 having an outer annular wall provided with a gasket 48 at its upper edge and having a bottom portion 50 somewhat higher than an annular trough 52 that receives the juice. This trough leads to an opening 54 below which a spout 56 is mounted for directing the juice to glass or the like set on the surface S beside the base 10.

The receptacle 46 is supported on the cover plate 26 by means of six inserts of rubber or the like illustrated at 58. The bottom 59 of the receptacle has six indentations 60 to receive the inserts 58 and thus the receptacle 46 is held against any tendency to rotate. The bottom member 50 terminates in a central upstanding annular flange 62 surrounding a bearing hub 64 of the motor M in which a ball bearing assembly 66 is mounted for journalling the sleeve 28 in a manner suitable for high speed rotation of the motor armature and the basket 38.

An annular pulp receiving trough is provided having a bottom wall 68 and inner and outer walls 70 and 72. The inner wall 70 terminates in a flange 74 supported on the gasket 48 and the outer wall terminates in a flange 76 adapted to support a lid L.

The lid L is preferably of transparent material such as molded plastic so that the operation of the juicer can at all times be observed. It has a depending fruit and vegetable chute 78 flared out at 80 and adapted to receive a plunger P. The plunger may be formed of wood or the like having a knob 82, an enlarged part 84 and a reduced part 86. The plunger also has a flange 88 to limit its downward movement so that its lower end just clears the grater 20 as shown in Figure 3.

The cover plate 26 it will be noted is held spaced above a rim 90 at the upper end of the base 10 which is inserted in the inserts 22. Between these inserts a space is provided for air circulation as indicated by the arrow $a$ in Figure 1 and the air is circulated by means of a fan 92 mounted on the lower end of the motor shaft 16 as shown in Figure 1. A cover plate 94 is provided for the bottom of the base 10 and it is perforated as at 96 to permit air entry as indicated by the arrows $b$.

The lid L is normally retained in operating position by arms 97 pivoted at 98 to the base 10. Loops 100 on the upper ends of the arms spring into and out of position over the marginal edge of the lid. The arms are resilient for this purpose and to minimize transmission of vibrations from the lid to the base.

*Practical Operation*

In the operation of my juicer the plunger P is removed from the chute 78 and the motor M is energized for rapidly rotating the grater plate 18 and the juice separator basket 38. Vegetables or fruit are introduced against the teeth 20 by placing them in the chute 78 and feeding them downwardly by means of the plunger P. The pulp is grated from the material and the pulp and juice are both thrown by centrifugal force against the wall of the basket 38.

The centrifugal force discharges the juice through the perforations of the basket, which perforations are very minute so as to prevent the pulp from passing therethrough. Instead the pulp is retained in the basket and works up along the inclined wall thereof as it becomes drier and as additional vegetables or fruit are fed to the grater plate.

The pulp finally discharges over the binding 44 and into the annular pulp receiving trough T, the lid L serving, due to its shape, as a guide to direct the pulp into the trough. A considerable number of vegetables or a considerable quantity of fruit can be juiced before it is necessary to empty the pulp from the machine. Thus the machine can operate continuously for several glasses of juice which is a considerable convenience when compared with those types of juicers that retain the pulp in the juice separating basket and therefore necessitate cleaning the pulp out for about every glass of juice.

The general type of juicer mechanism here shown is disclosed in the Knapp Patent 2,289,656, issued July 4, 1942. The present invention provides a perforated basket in which the wall is inclined so that the pulp works out of the basket, and provides an annular pulp receiving trough to receive a considerable quantity of pulp before it is necessary to clean out the machine.

When it is necessary to clean out the machine the parts may be readily dis-assembled by swinging the loops 100 of the pivoted lid retaining arms 96 outwardly from their positions in Figure 3 to release the lid. The lid may then be removed after which the grater basket 38 is removed by pressing inwardly on the lock pin 34 and rotating the basket in a direction to unscrew the grater plate 18 from the threads 14 of the motor shaft 16. This removes obstructions so that the trough T can be lifted from the receptacle 46 and then the receptacle 46 lifted from the inserts 58 of the cover plate 26. The separation of these parts is illustrated in Figure 4 by means of an exploded perspective view of the parts.

The parts may then be washed and returned in reverse order to position for operation of the juicer. The dis-assembly and assembly of the parts can be done in a minimum of time and with maximum convenience.

Some changes may be made in the construction and arrangement of the parts of my juicer without departing from the real spirit and purpose of my invention, and it is my intention to cover by my claims any modified forms of structure or use of mechanical equivalents which may be reasonably included within their scope.

I claim as my invention:

1. A juicer comprising a motor operated grater plate, a juice separating basket mounted for rotation therewith, said basket being perforated to permit centrifugal separation of juice from pulp, the wall of said basket being upwardly and outwardly inclined to cause upward movement of the pulp along said wall, an annular pulp receiving receptacle surrounding and being of substantially the same height as said juice receiving receptacle and being removable for emptying, said pulp receiving receptacle having an inturned flange supported on the upper edge of the juice receiving receptacle, a cover for said receptacles and basket supported on the outer edge of said pulp receiving receptacle, said cover having a downwardly and outwardly directed annular portion above the pulp receiving receptacle spaced from and in alignment with the inclined wall of said basket, whereby pulp ejected by centrifugal force from the upper edge of the basket strikes the downwardly and outwardly directed annular portion of the cover and is guided thereby into said pulp receiving receptacle, a base for supporting the juice receiving receptacle and resilient inserts carried by the upper end of the base upon which said juice receptacle is supported.

2. A juicer comprising a motor operated grater plate, a juice separating basket mounted for rotation therewith, said basket being perforated to premit centrifugal separation of juice from pulp, the wall of said basket being upwardly and outwardly inclined to cause upward movement of the pulp along said wall, an annular pulp receiving receptacle surrounding and being of substantially the same height as said juice receiving receptacle and being removable for emptying, said pulp receiving receptacle having an inturned flange supported on the upper edge of the juice receiving receptacle, a cover for said receptacles and basket supported on the outer edge of said pulp receiving receptacle, said cover having a downwardly and outwardly directed annular portion above the pulp receiving receptacle spaced from and in alignment with the inclined wall of said basket, whereby pulp ejected by centrifugal force from the upper edge of the basket strikes the downwardly and outwardly directed annular portion of the cover and is guided thereby into said pulp receiving receptacle, a base for supporting the juice receiving receptacle, resilient inserts carried by the upper end of the base upon which said juice receptacle is supported and resilient arms pivotally secured to the base for retaining the cover in position over said receptacles and permitting slight movement of the cover and receptacles on said rubber inserts.

3. A juicer for fruit and vegetables comprising a motor rotated, substantially flat grater plate, a juice basket supported thereby, said basket being perforated to permit centrifugal separation of juice from pulp, the wall of said basket being upwardly and outwardly inclined to cause upward movement of the pulp along the wall, a base from the top of which said motor is suspended by resilient means, resilient inserts carried by the upper end of motor, a juice receptacle supported on said inserts and surrounding said perforated basket, an annular pulp receiving trough supported on said receptacle and surrounding it, a cover supported on said annular trough and resilient arms pivotally secured to the base for retaining the cover in position over said receptacles and permitting slight movement of the cover and receptacles on said rubber inserts.

4. A juicer for fruit and vegetables comprising a rotary grater plate, a motor for rotating said plate, a juice separating basket connected therewith for rotation therewith, said basket being perforated to permit centrifugal separation of juice from pulp, a juice receiving receptacle surrounding said basket, a pulp receiving receptacle surrounding said juice receiving receptacle, said pulp receiving receptacle having an inturned flange for support on the upper edge of said juice receiving receptacle, a cover for said receptacles and basket supported on the outer edge of said pulp receiving basket and constituting a guide for pulp from the basket to the pulp receptacle, a supporting base said juice receiving receptacle being supported on said base, resilient inserts between said base and said receptacle, and means for resiliently supporting the motor from the base.

5. A juicer for fruit and vegetables comprising a motor rotated grater member, a juicer separating basket supported thereby, said basket being perforated to permit centrifugal separation of juice from pulp, a hollow base enclosing said motor, an annular member disposed around the top of said motor and supported by resilient means on the top of said base, means for suspending said motor from said annular member, resilient inserts carried by said annular member, a juice receptacle supported on said inserts and surrounding said basket, an annular pulp receiving trough supported on and surrounding said receptacle and a cover supported on said annular trough.

6. A juicer for fruit and vegetables comprising a rotary grater plate, a motor for rotating said plate, a supporting base for said motor, means for resiliently supporting said motor from said base, a juice separating basket connected with said plate for rotation therewith, said basket being perforated to permit centrifugal separation of juice from pulp, a juice receiving receptacle surrounding said basket, a pulp receiving receptacle surrounding said juice receiving receptacle, said pulp receiving receptacle having an inturned flange for support on the upper edge of said juice receiving receptacle, a cover for said receptacles and basket supported on the outer edge of said pulp receiving basket and constituting a guide for pulp from the basket to the pulp receptacle, said juice receiving receptacle being supported on said base, and resilient inserts between said base and said receptacle.

WILLIAM E. GUNDELFINGER.

REFERENCES CITED

The following references are of record in the file of this patent:

UNITED STATES PATENTS

| Number | Name | Date |
| --- | --- | --- |
| 1,886,092 | Graham | Nov. 1, 1932 |
| 2,180,877 | Lorenzen | Nov. 21, 1939 |
| 2,289,656 | Knapp | July 14, 1942 |
| 2,297,880 | Fredrickson | Oct. 6, 1942 |
| 2,302,138 | Nicholson | Nov. 17, 1942 |
| 2,387,975 | Bennett | Oct. 30, 1945 |